United States Patent [19]

Saito et al.

[11] Patent Number: 4,777,600
[45] Date of Patent: Oct. 11, 1988

[54] PHONETIC DATA-TO-KANJI CHARACTER CONVERTER WITH A SYNTAX ANALYZER TO ALTER PRIORITY ORDER OF DISPLAYED KANJI HOMONYMS

[75] Inventors: Hiroyoshi Saito, Yokohama; Kimihito Takeda, Odawara; Tsutomu Kawada, Yokohama; Shigemi Nakasato, Kawasaki; Tatsuji Kusumoto, Tokyo, all of Japan

[73] Assignee: Kabushiki Kaisha Toshiba, Kawasaki, Japan

[21] Appl. No.: 889,761

[22] Filed: Jul. 28, 1986

[30] Foreign Application Priority Data

Aug. 1, 1985 [JP] Japan ............... 60-170028

[51] Int. Cl.⁴ .......................... G06F 15/38
[52] U.S. Cl. .................. 364/419; 364/900
[58] Field of Search ... 364/200 MS File, 900 MS File, 364/419; 434/157; 400/110

[56] References Cited

U.S. PATENT DOCUMENTS

| | | | |
|---|---|---|---|
| 4,531,119 | 7/1985 | Nakayama et al. | 400/110 X |
| 4,543,631 | 9/1985 | Kurosu et al. | 364/419 X |
| 4,544,276 | 10/1985 | Horodeck | 400/110 |
| 4,641,264 | 2/1987 | Nitta et al. | 364/419 X |

FOREIGN PATENT DOCUMENTS 0003017 1/1985 Japan .
0124774 7/1985 Japan .

Primary Examiner—Jerry Smith
Assistant Examiner—Clark A. Jablon
Attorney, Agent, or Firm—Oblon, Fisher, Spivak, McClelland, & Maier

[57] ABSTRACT

An input processing system inputs character string data including kanji characters and corresponding to phonetic data by entering phonetic data. An input device sequentially inputs phonetic data and sentence end data. A conversion section includes a conversion processor, a syntactic analyzer, and a priority order alterator. The conversion processor sequentially converts character string data in a predetermined conversion unit. If single phonetic data includes a plurality of conversion possibilities in the predetermined conversion unit, character string data is selected according to a predetermined priority order, thereby obtaining character string data (including kanji characters) corresponding to input phonetic data. The syntactic analyzer performs syntactic analysis of a sentence consisting of the character string data in response to sentence end data. The priority alterator alters the priority orders of the conversion possibilities corresponding to identical phonetic data for the conversion processor according to syntactic analysis results, and alters the already selected possibilities as needed. The character string data from the conversion processor in the conversion section is displayed on a diplay.

14 Claims, 4 Drawing Sheets

FIG. 2

| ADDRESS | PHONETIC DATA | CHARACTER STRINGS | PARTS OF SPEECH | CLASSIFI-CATION CODES | SEMANTIC RELATIONS |
|---|---|---|---|---|---|
| P11<br>P12<br>P13 | KISHA<br>KISHA<br>KISHA | 貴社～K11<br>記者～K12<br>汽車～K13 | NOUN<br>NOUN<br>NOUN | b<br>a<br>c | |
| P21 | TOUKYOU | 東京～K21 | PROPER NOUN | d | |
| P31 | HASSHASURU | 発車する～K31 | VERB | s | (a/c)ga(d)wo ～R31 |
| P41 | HOUMONSURU | 訪問する～K41 | VERB | s | (a)ga(a/b/d)wo ～R41 |

PHONETIC DATA-TO-KANJI CHARACTER CONVERTER WITH A SYNTAX ANALYZER TO ALTER PRIORITY ORDER OF DISPLAYED KANJI HOMONYMS

BACKGROUND OF THE INVENTION

The present invention relates to an input processing system for inputting string data including "kanji (Chinese characters)" in a computer system or a wordprocessor. More particularly, the present invention relates to an input processing system employing a scheme for inputting kanji as phonetic data and converting the phonetic data to a corresponding kanji character so as to obtain a desired kanji character, wherein a proper word (or a phrase) is selected from a plurality of homonyms in conversion from phonetic data to the corresponding kanji character, thereby simplifying input operations.

Japanese wordprocessors have been recently very popular among domestic users, as well as Japanese in foreign countries and foreigners who learn Japanese. In a conventional input processing system used in a Japanese wordprocessor, phonetic data constituting a sentence, a phrase, or a clause including kanji is input in units of words, clauses or sets of clauses and converted into a character string including both kanji characters (ideographic characters used in written Japanese) and kana (Japanese phonetic characters used in only written Japanese). Kana characters are classified into "hiragana" and "katakana" characters, which are properly selected according to Japanese usage. Since these kana characters are phonetic symbols, they directly correspond to phonetic data. Kanji characters have an etiological origin in Chinese. Ordinary Japanese sentences, phrases, or clauses are written by character strings including kanji and kana characters. The phonetic data is input by kana characters or alphabetic character strings representing Japanese phonetic symbols. In conversion from phonetic data to a character string including kanji and kana characters, a kana-to-kanji conversion dictionary as a conversion data base is retrieved. This dictionary is a data base which uses phonetic data as a key to search a kanji character string or a character string including kanji and kana characters.

Since the Japanese language includes a lot of homonyms, a plurality of conversion possibilities or candidates are often listed in kana/kanji conversion. In a conventional system, if a plurality of conversion possibilities are present, an operator operates a key for switching a possibility display from one to another among the selected conversion possibilities, that is, the next conversion possibility key is operated to display the correct word (or phrase) among the plurality of possibilities. When the proper possibility is displayed, it is selected as the conversion result.

However, selection operation for homonyms is cumbersome and time-consuming. In a conventional system, the previous selection frequencies of homonyms are sequentially checked, and the priority order of the conversion possibilities is determined according to the order of frequencies. For an identical combination of homonyms, a word (or a phrase) which has been most frequently selected in the preceding operations is displayed as the first conversion possibility. In another conventional system, since identical words are frequently repeated in a single sentence, the immediately preceding or last selected word (or phrase) is displayed as the first conversion possibility.

These systems greatly reduce operation load, and more particularly, the number of key depressions in homonymic selection.

However, different homonyms often appear in a single sentence. According to the frequency check scheme described above, the conversion possibility having a higher frequency is selected although a conversion possibility having the lowest frequency is to be selected. According to the last conversion possibility selection scheme, homonymic selection must be performed whenever the corresponding phonetic data appears. The above implementations result in inconvenience.

It may be possible to introduce syntactic analysis of machine translation techniques into input processing for selecting homonyms. However, since the syntactic analysis is performed in units of sentences, it cannot be applied to an input processing system for converting kana characters into kanji characters in units of words or clauses.

An improved conventional input processing system used in a Japanese wordprocessor is also available. According to this system, phonetic data without segmentation is input, segmented in the system, and sequentially subjected to kana-kanji conversion. However, in practice, the number of characters constituting phonetic data input by a single operation cycle is limited due to the limitations of number of data which can be processed in combination in the system. According to still another system, phonetic data segmentation in units of words or clauses from the beginning of the sentence is automatically detected by the system, and kana-kanji conversion is performed in units of detected segmentations.

Even if one sentence is input, it is segmented into words or clauses which are then converted from kana characters to kanji characters. Therefore, syntactic analysis of the entire sentence cannot be applied to the conventional input processing systems.

In addition, in order to perform the syntactic analysis, one sentence must be completely input. If one sentence is not completely input, the conversion result cannot be obtained. It takes a long period of time to obtain the conversion result after the sentence input is started. If phonetic data is input while a document is being drafted, the already input data (corresponding to a portion whose conversion result is not displayed yet) cannot be checked.

SUMMARY OF THE INVENTION

It is an object of the present invention to provide an input processing system wherein a meaningful word (or a phrase) can be selected as a conversion possibility having a higher priority without prolonging the time required for obtaining a conversion result from phonetic data to kanji characters and/or without increasing the data area required for conversion processing, and wherein operation for selecting homonyms can be simplified.

In order to achieve the above object of the present invention, there is provided an input processing system for inputting character string data including kanji characters according to corresponding phonetic data, comprising: an input device for inputting phonetic data and sentence end data representing an end of a sentence; a conversion processor for sequentially converting the phonetic data input by the input device into character string data in a predetermined conversion unit, for selecting character string data having the highest priority according to a predetermined priority order in the predetermined conversion unit if a plurality of conversion possibilities are present, and for obtaining the character string data which includes kanji characters and which corresponds to the phonetic data; a syntactic analyzer for analyzing syntactic relations in the character string data from the conversion processor in response to the sentence end data from the input device; a priority order alterator for altering the priority order of the plurality of conversion possibilities corresponding to homonymic data in the conversion processor, and for altering selection of the character string data according to an altered priority order; and an output device for sequentially displaying the character string input from the conversion processor.

According to the input processing system of the present invention, phonetic data is converted into kanji characters in the predetermined conversion unit and displayed on a screen according to appearance frequency data and last selection data. Neither the conversion result display is delayed nor is the processing data area in the system increased. In addition, when sentence end data is input, the already converted sentence is subjected to syntactic analysis. The priority order of conversion possibilities, (i.e., homonyms) selectively displayed is altered according to the analysis result. More specifically, as a result of analysis, the priority order of conversion possibilities whose semantic relations (i.e., the relationship representing strong connections from the semantic viewpoint) with other words are not defined, is lowered. If a conversion possibility (whose semantic relations with other words in sentences are not defined) is already displayed, it is replaced with another conversion possibility of a higher priority order having a registered semantic relation with other words. The probability of displaying a meaningless homonym can be effectively reduced. As a result, the number of depressions of the key for homonym selection can be reduced to improve operability for inputting sentences or the like.

BRIEF DESCRIPTION OF THE DRAWINGS

FIG. 2 is a table showing the contents of a dictionary memory in the system of FIG. 1;

FIGS. 4A–4C, 5 and 6 are views for explaining input processing in the system of FIG. 1.

DETAILED DESCRIPTION OF THE PREFERRED EMBODIMENT

Figure 1:
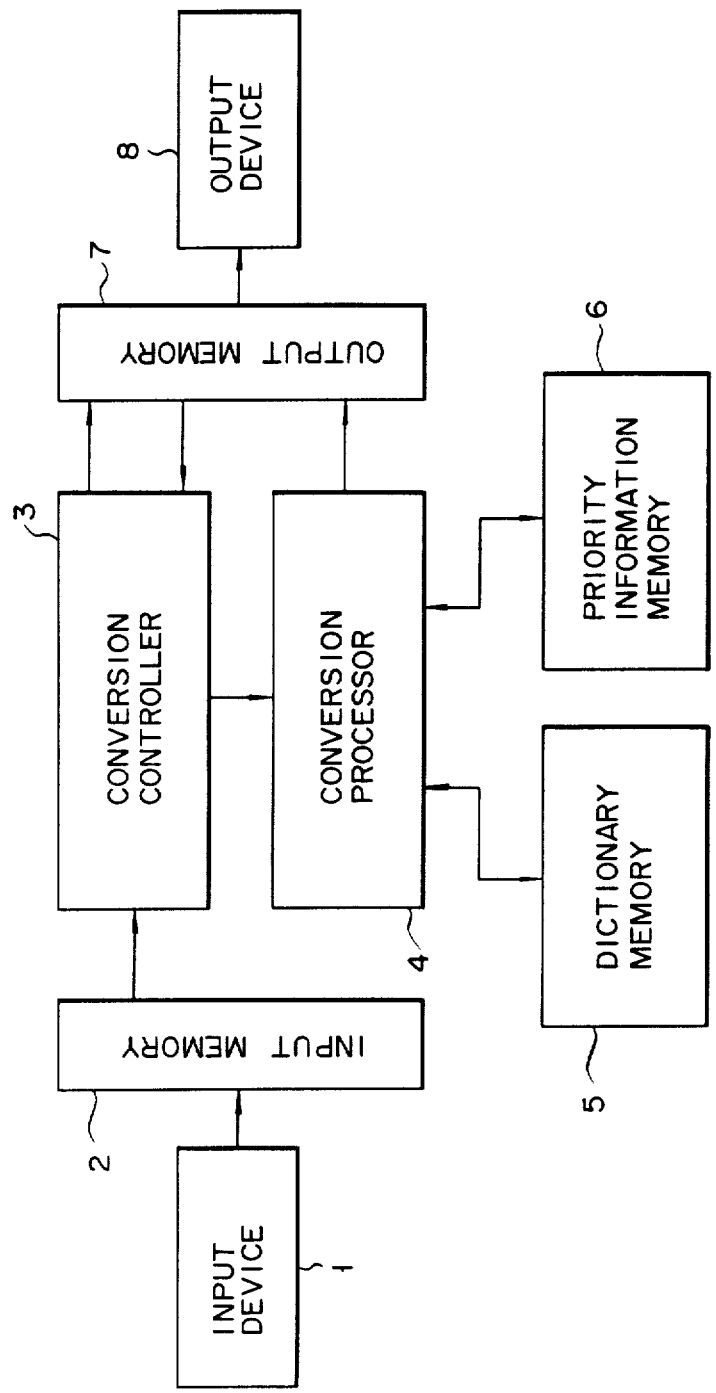
FIG. 1 is a block diagram showing a schematic configuration of an input processing system according to an embodiment of the present invention.

FIG. 1 shows an input processing system employed in a Japanese wordprocessor input device according to an embodiment of the present invention.

Input device 1 comprises an alphanumeric keyboard. Phonetic data is entered at device 1. In this embodiment, phonetic data is input at device 1 in the alphabetical form. However, a kana keyboard can be used to constitute input device 1 so as to input phonetic data. Alternatively, device 1 may have a speech recognition function so that phonetic data is entered by speech inputs. The alphabetical phonetic data directly corresponds to kana characters in Japanese. Sentence end data and conversion unit end data are also entered at input device 1. The sentence end data is entered by a full stop or parenthesis key. The conversion unit end data is a key input from a predetermined function key.

Phonetic data input at input device 1 is stored in input memory 2 as a buffer memory and transferred from memory 2 to conversion controller 3. The phonetic data is segmented in a predetermined processing unit, e.g., in units of words or clauses under the control of controller 3. The segmented data is then subjected to kana-kanji conversion processing (in this case, alphabetical phonetic data is converted to kanji characters. Such phonetic data directly corresponds to kana characters and can be immediately converted to kana data according to a predetermined conversion table. Conversion from phonetic data to kanji characters is called kana-kanji conversion hereinafter).

Conversion processor 4 uses dictionary data for kana-kanji conversion and produces a kana-kanji conversion result for input phonetic data in the predetermined processing unit. If a plurality of homonyms, i.e., conversion possibilities, correspond to one phonetic data, processor 4 selects the highest priority as a conversion result determined by the appearance frequency data and/or the last selection data which is sequentially altered and stored in priority information memory 6.

Kana-kanji conversion processing includes inflection and adjunct detection operations. The frequency data and/or last selection data stored in priority information memory 6 is sequentially updated according to the kana-kanji conversion processing result.

Sequentially converted strings including both kanji and kana characters are stored in output memory 7 as a buffer memory. Data stored in memory 7 is displayed at output device 8 having a display function.

When sentence end data representing a sentence end such as a full stop is input at input device 1, conversion controller 3 starts syntactic analysis. One sentence data consisting of a conversion possibility string stored in output memory 7 is analyzed, and semantic relations (strong connections from the semantic viewpoint) between the conversion possibilities are checked. If a conversion possibility representing a plurality of homonyms (other conversion possibilities) does not have semantic relations with other words, the priority order of such a conversion possibility is lowered since it is improper. As a result, another conversion possibility, i.e., a possibility having semantic relations with other words is selected as the conversion result corresponding to phonetic data. The last conversion result is stored in memory 7 so that the previous conversion result is updated.

Dictionary memory 5 is a data base for storing conversion possibility data as a character string of a mixture of kana and kanji characters so as to correspond to each phonetic data, parts-of-speech data, classification code data and semantic relation data.

The character strings corresponding to phonetic data and their parts of speech have the same dictionary data formats as in the conventional conversion processing, in units of clauses.

The classification codes and the semantic relations are used in the syntactic analysis described above. The classification codes are used to simply classify the characteristics of the words from the semantic viewpoint. For example, nouns representing "natural persons" are classified as a, nouns representing "organizations or corporate bodies" are classified as b, nouns representing "vehicles" are classified as c, and nouns representing "places" are classiiied as d. Verbs are represented by classification code s. Semantic relations are related to subjects and objects for verbs. Therefore, each semantic relation represents connections of a verb with a noun having a given classification code and given kakujoshi, i.e., given propositional words functioning as auxiliaries to main words (to be referred to as propositional words hereinafter).

Referring to FIG. 2, phonetic data "kisha" is stored at address P11. Character string K11 (it means "your company") corresponds to "kisha". This word is a noun classified as the one having code b and does not have any registered semantic relation. Phonetic data "kisha" is also stored at address P12. Character string K12 (it means a "journalist") corresponds to "kisha" at address P12. This word is a noun classified as the one having code a and does not have any registered semantic relation. Phonetic data "kisha" is also stored at address P13. Character string K13 (it means a "train") corresponds to "kisha" at address P13. This word is a noun classified as the one having code c and does not have any registered semantic relation. Phonetic data "toukyou" is stored at address P21. Character string K21 (it means Tokyo, the capital of Japan) corresponds to the phonetic data at address P21. This word is a proper noun having code d and does not have any registered semantic relation. Phonetic data "hasshasuru" is stored at address P31. Character string K31 (it means "start") corresponds to "hasshasuru". This word is a verb having code s and has registered semantic relation R31, i.e., "(a/c) start from (d)". Phonetic data "houmonsuru" is stored at address P41. Character string K41 (it means "visit") corresponds to "houmonsuru". This word is a verb having code s and has registered semantic relation R41, i.e., "(a) visit (a/b/d)".

For example, since the semantic relation for character string K31 of verb "hasshasuru" is given by R31, so that "a vehicle or a person" starts a "place".

Figure 3:
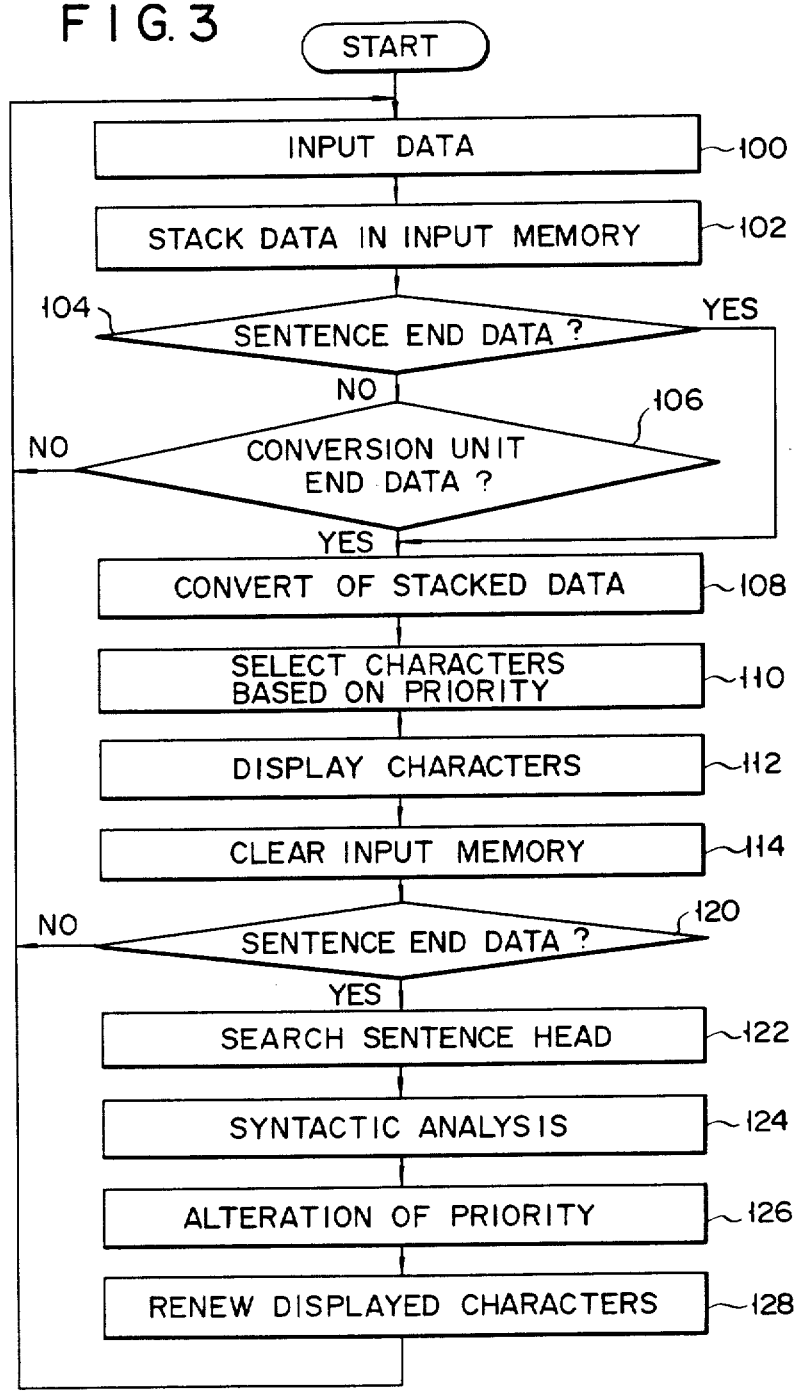
FIG. 3 is a flow chart showing a control sequence of a conversion controller in the system of FIG. 1.

The operation of conversion controller 3 will be described in detail with reference to a flow chart in FIG. 3.

If conversion controller 3 receives phonetic data from input device 1 (step 100), input data is stacked in input memory 2 (step 102).

Conversion controller 3 then determines whether the phonetic data represents a full stop or a parenthesis representing the end of sentence, whether the phonetic data represents conversion unit end data, and whether the phonetic data represents alphabetic character data representing simple phonetic information (steps 104 and 106).

If the input data is an alphabetic character code representing phonetic information, the flow returns to step 100. The next data is input (step 100) and then stacked in input memory 2 (step 102).

If the input data is however sentence end data representing a full stop, or the like, or conversion unit end data entered upon operation of a predetermined function key, kana-kanji conversion processing is performed for the phonetic data strings stacked in input memory 2 (step 108). This processing is performed by supplying the phonetic data strings to conversion processor 4.

If conversion processor 4 obtains conversion possibilities for the input character strings by accessing dictionary memory 5, conversion controller 3 selects one possibility based on priority information stored in priority information memory 6 (step 110). Conversion possibility selection for a plurality of conversion possibilities as homonyms is performed by sending an instruction to conversion processor 4. The conversion possibility having the highest priority is selected by processor 4 according to the appearance frequency data and last selection data. The selected conversion possibility is the conversion result corresponding to the input phonetic data.

The conversion result is transferred to output memory 7 and displayed at output device 8 (step 112).

After kana-kanji conversion processing in the predetermined processing unit is completed and the conversion result is stored in output memory 7, conversion controller 3 erases the phonetic data string stored in input memory 2 (step 114) and prepares for the next phonetic data input.

Conversion controller 3 determines whether last input data of the input data strings converted as described above is sentence end data representing a full stop or the like (step 120). If the last input data is determined to be the conversion unit segmentation data, the above operation is repeated. The phonetic data string input in the predetermined conversion unit is subjected to kana-kanji conversion again. However, if the last input data is determined to be the sentence end data (e.g., a full stop), the following operation is performed. It should be noted that determination for the last input data as the sentence end data is performed by retrieving a flag which was set upon determination of the input data as the sentence end data in step 104.

If the last input data is the sentence end data and the sentence segmentation for the input data strings input so far is detected, one sentence data represented by the conversion results in the predetermined conversion unit is stored in output memory 7. Conversion controller 3 reads out the conversion results, in the conversion unit, sequentially stored in output memory 7, and searches the sentence head (step 122). The classification codes and the semantic relations for the conversion results in the conversion unit are assigned thereto from the sentence head, thereby performing syntactic analysis (step 124).

The syntactic analysis is performed such that classification codes of other words are checked according to the semantic relations of the conversion results so as to determine that connection conditions are satisfied. By the syntactic analysis, conversion controller 3 determines that the conversion results in output memory 7 satisfy the predetermined semantic relations with other conversion results.

If a conversion possibility which does not satisfy the semantic relation is found, controller 3 determines that it is an improper possibility as the conversion result. The priority of the conversion possibility is lowered. Alteration of the output priority results in selection of another conversion possibility (i.e., a homonym) as the possibility having the highest priority. The semantic relations of this conversion possibility are also checked as described above.

A conversion possibility which satisfies semantic relations with other words can be selected from a plurality of homonyms (step 126). It should be noted the homonym having the highest priority is selected among the homonyms satisfying the semantic relations.

A new conversion possibility selected instead of the conversion result which does not satisfy semantic relation is replaced with the corresponding conversion result transferred to output memory 7. As a result, the sentence information consisting of only conversion results satisfying the semantic relations is stored in output memory 7. This sentence data is updated and displayed at output device 8 (step 128).

The next conversion possibility for the character string having a plurality of conversion possibilities can be altered in response to the next conversion possibility selection command from input device 1, if necessary. However, since the conversion possibilities having improper semantic relations are eliminated by processing described above, a proper conversion result can be usually obtained. In this case, the next input operation can be started.

An example of processing in this system will be described in detail with reference to FIGS. 4 to 6.

If phonetic data "kisha-ga" and then conversion end unit data are input at input device 1, the phonetic data is supplied to conversion processor 4 so that kana characters are converted to kanji characters.

In this case, as shown in FIG. 2, there are three conversion possibilities K11, K12, and K13, for phonetic data "kisha".

If the conversion possibilities are stored in dictionary memory 5 from the one having highest priority, for example, character string K11 (your company) is selected as a conversion result. This conversion result data is stored in output memory 7 and displayed at output device 8, as shown in FIG. 4A.

Phonetic data "toukyou-wo" is then input and the conversion unit data is instructed. Character string K21 is selected as the conversion result since only one character string corresponds to the phonetic data. The obtained conversion result is stored in output memory 7, following the immediately preceding result. Therefore, as shown in FIG. 4B, a character string, including strings K11 and K21, is displayed at output device 8.

Phonetic data "houmonsuru" and sentence end data are then entered. Character string K41 is obtained as the conversion result corresponding to phonetic data "houmonsuru". The syntactic analysis is then started in response to the sentence end data.

In the syntactic analysis, all the conversion possibilities, in the conversion unit, which constitute the corresponding sentence and which are stored in output memory 7, are read out therefrom and transferred to conversion controller 3 to check homonyms of each conversion possibility. At the same time, the semantic connection relations of the conversion possibilities are checked according to the classification codes and the semantic relations.

The conversion possibility data in FIG. 5 can be obtained from data read out from output memory 7. Conversion possibilities K11 to K13, separated by marks "#" and "*", in FIG. 5 are homonyms.

The relations between the conversion possibilities as homonyms and other conversion possibilities connected thereto through propositional words are illustrated in FIG. 6.

When the validity of the semantic connection relations is checked according to the classification codes and the semantic relations, only the semantic connection relation is given for character string K41:

"(a) ga (a/b/d) wo houmonsuru"
that is,
(a) visit (a/b/d) therefore,
"(a) ga [K21] wo [K41]"
In addition, since [K11] has classification code (b), "[K11] ga [K21] wo [K41]"
The above semantic connection is not registered and is thus improper. In this case, only conversion possibility K12 having classification code (a) only satisfies the semantic relation for K41, that is,
"[K12] ga [K21] wo [K41]"
The output priority order of conversion possibility K11 is lowered, and the conversion result is corrected to select conversion possibility K12 in place of possibility K11. As a result, the conversion result is obtained, as shown in FIG. 4C.

The construction of the already converted sentence is analyzed in response to the sentence end data, and thus the conversion possibilities satisfying the predetermined semantic relations are selected.

The conversion possibilities as homonyms are selected and corrected according to priority information based on the appearance frequency data or the like. Therefore, the proper conversion results can be effectively obtained. The number of selection operations for the homonyms can be reduced and input operation efficiency can be improved. In addition, the conversion results for the input phonetic data can be obtained at high speed. As soon as one sentence is input, conversion possibilities having improper semantic relations can be corrected or eliminated. More proper conversion results can be obtained, thereby further simplifying the input operation for document drafting.

The present invention is not limited to the particular embodiment described above.

For example, instead of designating the conversion unit by manual inputs, phonetic data may be automatically segmented in a predetermined processing unit in the system and may be subjected to kana-kanji conversion processing in the predetermined processing unit.

The present invention is not limited to Japanese wordprocessors but can be extended to Chinese wordprocessors using ideographic characters. The present invention may also be applied to a system for processing Japanese or Chinese including kanji characters, e.g., a preprocessing system for entering data in a Japanese-English machine translation system or the like.

What is claimed is:

1. A phonetic data-to-kanji characters converter for converting character string data including Kanji characters, comprising:
   input means for inputting phonetic data and sentence end data representing an end of a sentence;
   conversion processing means for sequentially converting the phonetic data input by said input means into character string data in a predetermined train of the phonetic data, selecting character string data having the highest priority according to a predetermined priority order in the predetermined train of the phonetic data if a plurality of conversion possibilities are present, and obtaining the character string data which corresponds to the phonetic data;
   storing means for storing, in accordance with said priority order, all of the character string data obtained by said conversion processing means;
   syntactic analyzing means for analyzing syntactic relations in the character string data from said conversion processing means in response to the sentence end data from said input means;
   priority order altering means for altering, based on the analyzed syntactic relations, the priority order of the plurality of conversion possibilities corresponding to homonymic data during the processing of said conversion processing means, and altering selection of the character string data according to an altered priority order; and output means for sequentially displaying the character string input from said conversion processing means.

2. A system according to claim 1, wherein said syntactic analyzing means includes means for selecting a conversion possibility whose semantic relation with other words in the character string data is not defined, among conversion possibilities as homonyms obtained in character string data from said conversion processing means, and said priority altering means includes means for lowering a priority order of the conversion possibility whose semantic relation with other words in the character string data is not defined and which is selected by said syntactic analyzing means.

3. A system according to claim 1, wherein said conversion processing means comprises means for converting the phonetic data into the character string in units of words or clauses.

4. A system according to claim 1, wherein said input means comprises means for inputting a full stop or a parenthesis as sentence end data.

5. A system according to claim 1, wherein said input means comprises means for inputting a phonetic alphabetic character string as phonetic data.

6. A system according to claim 1, wherein said input means comprises means for inputting a phonetic kana character string as the phonetic data.

7. A system according to claim 1, wherein said input means comprises a keyboard for inputting character data.

8. A system according to claim 1, wherein said conversion processing means comprises means for selecting a last selected conversion possibility as a conversion possibility having the highest priority for the phonetic data having a plurality of conversion possibilities.

9. A system according to claim 1, wherein said conversion processing means includes means for selecting a conversion possibility having the highest previous selection frequency as a conversion possibility having the highest priority for the phonetic data having a plurality of conversion possibilities.

10. A system according to claim 1, wherein said conversion processing means includes a dictionary means comprising a data base for obtaining the character string data corresponding to the phonetic data.

11. A system according to claim 1, wherein said conversion processing means includes dictionary means consisting of a data base for obtaining the character string data corresponding to the phonetic data and syntactic data for performing syntactic analysis, and said syntactic analyzing means includes means for performing the syntactic analysis on the basis of the syntactic data from said dictionary means.

12. A system according to claim 1, wherein said conversion processing means comprises means for converting Japanese phonetic data into character string data including kanji characters.

13. A system according to claim 1, wherein said conversion processing means comprises means for converting Chinese phonetic data into character string data including kanji characters.

14. A system according to claim 1, wherein said input means includes means for inputting conversion possibility alteration data for designating selection and alteration of the conversion possibilities, and said conversion processing means includes means for altering the conversion possibility to another conversion possibility having a second highest priority in response to the conversion possibility alteration data.

* * * * *